United States Patent

Van Brunt

[15] 3,695,168
[45] Oct. 3, 1972

[54] DRIP COFFEE MAKER

[72] Inventor: George H. Van Brunt, 1139 El Monte Drive, Thousand Oaks, Calif. 91360

[22] Filed: June 2, 1970

[21] Appl. No.: 48,028

[52] U.S. Cl. .................................. 99/306, 99/322
[51] Int. Cl. ......................... A47j 31/10, A47j 31/06
[58] Field of Search ........ 99/304, 306, 317, 321, 322, 99/299, 300, 295, 323

[56] References Cited

UNITED STATES PATENTS

| | | | |
|---|---|---|---|
| 1,489,893 | 4/1924 | Malcamp | 99/299 |
| 3,166,003 | 1/1965 | Merson | 99/206 |
| 1,681,656 | 8/1928 | Biette | 99/306 |
| 2,936,694 | 5/1960 | Donot | 99/304 X |

Primary Examiner—Walter A. Scheel
Assistant Examiner—Philip R. Coe
Attorney—Alan M. Shapiro

[57] ABSTRACT

The drip coffee maker makes an aqueous coffee infusion by providing a brewing chamber which has a micro-pore (microscopic openings) filter at the bottom outlet, and water inlet control means which controls the entry of water into the brewing chamber from an upper hot water chamber. With a proper micro-pore outlet filter, fines are prevented from passing therethrough into the finished infusion and, with water inlet control, the grounds are properly wetted for extraction in the optimum time.

14 Claims, 6 Drawing Figures

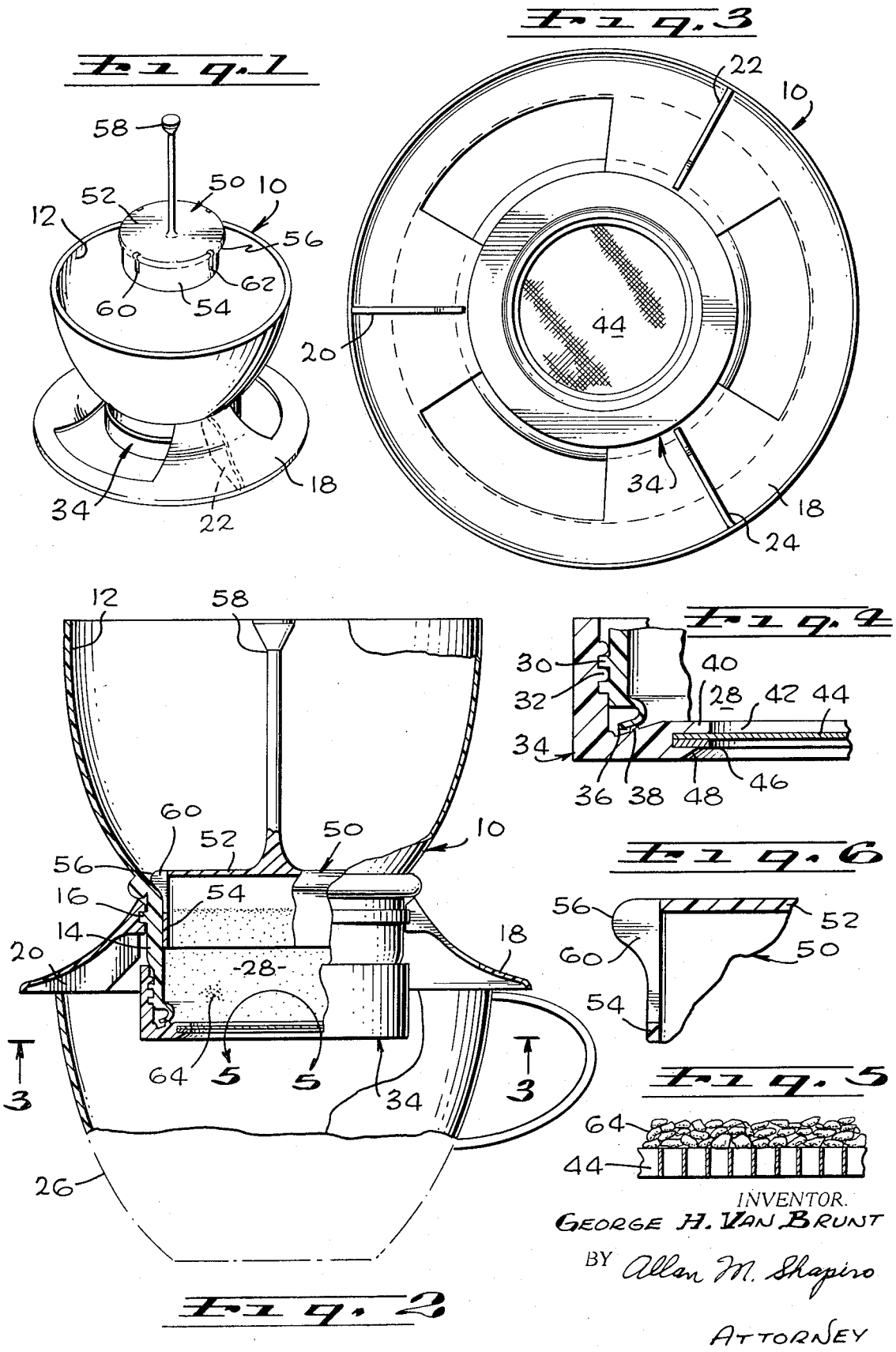

DRIP COFFEE MAKER

BACKGROUND OF THE INVENTION

1. Field of the Invention

This invention is directed to a drip coffee maker and especially to its coffee brewing chamber, with particular criticality in the brewing chamber inlet and outlet structure.

2. Description of the Prior Art

The two most popular home coffee making methods in general use today are by percolation and by drip. Each of these methods requires a specific grind of coffee adapted for its use. The coffee which is to be percolated is more coarse than the coffee intended for drip extraction.

The percolator must flow water quite rapidly through its extraction cycle of 6 to 8 minutes. The boiling water is forced upward through a tube and then flowed onto a pack of coarse coffee held in a perforated basket. The water flows quickly through the coffee resulting in only partial extraction of the coffee essence. The cycle must be repeated many times to obtain sufficient brew strength.

The percolation method is deficient in several ways. First, the water is too hot for proper extraction. Research has shown that water temperature should not be over 205° F., whereas in percolation it reaches 212°. Second, the coffee infusion itself is continually recycled at boiling temperature. Experts consider this practice unacceptable as flavor and aroma are degraded. Third, the coarse coffee grind, which permits fast water flow therethrough, requires too long a brewing period, and the excessive brewing time coupled with the high temperature causes the extraction of bitter oils and acids. Fourth, the holes in the perforated basket must be large enough for fast liquid flow and therefore cannot adequately filter the brew. As a result, the infusion is filled with sediment which is unpalatable and, in addition, continues to release bitter taste elements into the brew. Fifth, the high-temperature recycling of the brew causes coffee oil and bitter tasting elements in the coffee to form on the basket, tube and brewing vessel. These deposits, unless constantly cleaned off, become rancid and impart harsh flavors to the coffee infusion.

Thus, it has become well recognized that the percolation method has excessive deficiencies, and the skilled artisans in this field have devoted themselves to development of coffee makers employing the drip method. There are two main types of drip coffee makers.

The first type of drip coffee maker uses a perforated basket to hold the ground coffee, and a perforated basket cover to distribute the water uniformly over the pack of coffee. Due to the limitations of piercing techniques, the perforations cannot be made in satisfactorily small diameters and, thus, a substantial amount of fines and coffee powder are passed. This produces sediment in the pot or coffee cup that, as with percolated coffee, is unpalatable and releases bitter elements into the brew. In addition, some of the larger particles of ground coffee often plug the perforated holes resulting in a radical increase in brewing time, and in some cases stop the water flow completely. Also, only a limited number of holes in the basket and cover can be used or the water flow will be too fast to permit full extraction. The small number of holes do not allow sufficient margin in the event of hole plugging to permit completion of the water flow within the recommended 6 minute time limit, and the coffee quality varies from run to run. The combination of perforated basket and cover in this type of coffee maker do not provide adequate water flow control to ensure uniform strength and flavor.

The second type of drip coffee maker employs a folded paper cone filter mounted within a cone-shaped plastic or glass brewing vessel. Ground coffee is placed in the filter cone, and hot water is poured directly upon the grounds. The turbulent action of the water causes a suspension of the coffee grounds in the water. Water immediately starts flowing through the filter, and the flow during the first 2 minutes consists of inadequately brewed coffee. By the time the water and the grounds have mixed for an adequate time for proper extraction, the fines settle out onto the filter to slow down flow. Thus, stronger coffee at the end of the cycle is mixed with weak, watery coffee from the start of the cycle. It will be readily appreciated that weak coffee combined with overly strong coffee does not produce the optimum brew that is possible when coffee is made at proper strength throughout the recommended brewing period of 3 to 6 minutes.

It is one of the prime objectives of the present invention to limit flow at the beginning of the cycle until the minimum extraction time has been accomplished, and then permit flow to be fairly rapid until essentially all the water is drained from the grounds. In this way, an optimum aqueous coffee infusion is accomplished.

It is apparent that the major deficiency in paper filter drip coffee makers is, once again, the absence of water flow control. This lack is accentuated by the variations in grind permitted under the drip coffee grind standard. As an example, if the fines and powder in a particular container of coffee are at the lowest percentage allowed by the drip grind standard, the brew flows through the paper filter too fast and is therefore too weak. If the fines and powder are to the upper limit of the standard, the flow may be too slow and produce too strong coffee filled with undesirable flavor elements.

Further deficiencies in the paper filter-type coffee maker of the prior art may be noted. First, disposal of the used filter and grounds is a messy process. Paper filters cannot be run through garbage disposals, and they are a sloppy nuisance in kitchen waste containers or trash barrels. Second, the constant need to buy new filter paper, which is not available in the average market, is often so much trouble to a housewife that these coffee makers are frequently abandoned in a cupboard and never used. Third, the filters are relatively expensive, and one year's supply for nominal 2 cup per day use is over 7 times the original cost of the coffee maker.

SUMMARY OF THE INVENTION

In order to aid in the understanding of this invention, it can be stated in essentially summary form that it is directed to a coffee maker which is optimally and critically designed to provide a most desirable aqueous coffee infusion using the drip method. The coffee maker has a coffee brewing chamber with a micro-pore filter outlet of microscopic opening size, such as to retain all of the coffee ground fines and yet pass the aqueous coffee infusion at a satisfactory rate. Furthermore, the coffee chamber has controlled water inlet slots so that water enters the coffee chamber at the desired rate to wet the coffee grounds without substantially floating them, thus to prevent selective settling of the fines on the outlet filter. Furthermore, the water inlet passages control water flow into the coffee chamber in the early stages of the coffee brewing by the action of heated air, steam, and coffee gases which pass upwardly therethrough. These rising hot gases partially delay the flow of water during the first phase of brewing, and prevent weak coffee brew from passing rapidly through the filter.

The water flow control provided by the relatively large slots is not to be equated with the numerous small holes used in the basket covers of perforated drip coffee makers. In one type of perforate coffee maker, three or four of the small holes are in a raised center portion of the cover and vent all of the gases very rapidly and yet represent such a small portion of the cross sectional area of the total number of holes that they do not delay water flow appreciably. Other types of perforate coffee makers have vent holes, or perforations, in the upper half of the coffee basket and vent all steam and gas into the interior of the brew-receiving vessel. Thus, the escaping gases have no effect whatsoever on water flow.

The slots or openings used in the coffee maker of the preferred embodiment disclosed herein each vent gases for the first 30 to 50 seconds. This gas flow very effectively delays water flow as the water's weight (head pressure) cannot overcome the pressure of the escaping gases to enable free liquid flow.

Accordingly, it is an object of this invention to provide a coffee maker which is easily and economically constructed so that the coffee maker is avaiable for the ready brewing of a coffee infusion. It is a further object to provide a coffee maker which closely controls the inlet of water to the coffee chamber so that drip type or fine type coffee grinds can be utilized in making an aqueous coffee infusion. It is a further object to provide a drip coffee maker which has a coffee chamber therein having a micro-pore outlet filter and controlled water inlet channel so that water is permitted to enter therein at an appropriate rate to obtain an optimum coffee infusion. It is still another object to provide a coffee maker which can be constructed in a convenient size to drip brew a single cup of coffee, thus to provide the pleasure of freshly-brewed drip extracted coffee on a single cup basis.

The features of the present invention which are believed to be novel are set forth with particularity in the appended claims. The present invention, both as to its organization and manner of operation, together with further objects and advantages thereof, may be understood best by reference to the following description, taken in connection with the accompanying drawings.

BRIEF DESCRIPTION OF THE DRAWINGS

FIG. 1 is a partially exploded perspective view of a 1-cup capacity coffee maker of this invention.

FIG. 2 is an enlarged side elevational view, partly broken away and vertically sectioned, of the coffee maker shown in FIG. 1.

FIG. 3 is a bottom view taken generally along the line 3—3 of FIG. 2.

FIG. 4 is a fragmentary enlarged detail in vertical section of the structure shown in the lower left of FIG. 2.

FIG. 5 is an enlarged fragmentary diagrammatic view of the region indicated at line 5—5 of FIG. 2.

FIG. 6 is an enlarged fragmentary sectional view of the corner of the water flow controller, showing one of the water inlet passages.

DESCRIPTION OF THE PREFERRED EMBODIMENT

The preferred embodiment of the coffee maker of this invention is generally indicated at 10 in FIGS. 1, 2 and 3. Coffee maker 10 has an open-topped upper chamber 12 which serves as the water chamber into which hot water is poured. It is from the upper water chamber 12 that the water moves into the brewing chamber. Upper chamber 12 is formed with a substantial top opening so that water can be easily poured therein. The walls of water chamber 12 are inwardly sloping toward the bottom, as in a funnel.

Formed integrally with and depending downward from the upper chamber is cylindrical tube 14. The exterior of tube 14 carries ring 16, preferably integrally formed therewith. Base 18 is annular in form and engages upon ring 16. Base 18 has ribs 20, 22 and 24 formed therewith and extending downward to terminate in the plane substantially at the bottom of base 18. As is seen in FIG. 2, these ribs serve as means by which the coffee maker 10 is supported on the rim of cup 26 into which the infusion is discharged from coffee maker 10. Tube 14 can extend somewhat downward into the cup below the bottom of the ribs, as shown, but alternatively, the base 18 could be arranged to hold the coffee maker 10 above the rim of the cup, if desired.

As illustrated, base 18, as well as the main body of the coffee maker formed of upper chamber 12 and tube 14, are made of injection-moldable synthetic polymer composition material. Polyethylene and polypropylene are preferred materials, because of their convenient molding characteristics. In any event, the material of which the base 18 is formed is such that the base can be snapped up upon ring 16 so that these parts can be assembled without the need for additional securement. With a resilient snap-on construction of this nature, no screw threads or adhesives are required and economic assembly is accomplished.

The downwardly-depending tube 14 defines the coffee-brewing chamber 28 on the interior thereof. The lower exterior of tube 14 carries screw threads 30 thereon. Screw threads 30 threadedly interengage with threads 32 on filter holder 34. The threads on tube 14 are preferably substantially square in section, while the threads on filter holder 34 are substantially semi-circular in cross section. This arrangement of threads provides line contact and minimizes area contact to provide both a secondary seal and ease of screwing the filter holder 34 onto and off chamber-defining tube 14. The lower end of tube 14 carries resilient seal flange 36, which engages upon rib 38 formed on filter holder 34. Again, filter holder 34 is preferably formed of injection-moldable thermoplastic synthetic polymer composition material, and is preferably of the same material as the body of the coffee maker. As filter holder 34 is screwed onto the bottom of tube 14, resilient seal flange 36 is stressed, and the local stress concentration furnished by rib 38 provides a proper seal.

As is best seen in FIG. 4, the lower end of filter holder 34 has an inwardly directed flange 40 which defines opening 42. A micro-pore filter 44 is mounted upon mounting ring 46. Mounting ring 46 lies against flange 40 and a portion of filter holder 34 is thermoplastically rolled over the bottom of mounting ring 46 to form stop 48. Thus, the filter 44 is permanently held in place on its mounting ring.

The upper chamber 12 is separated from the coffee-brewing chamber 28 by means of water flow controller 50. This is best seen in FIGS. 1, 2 and 6, where flow controller 50 has a roof or cover 52 which is joined at its peripheral edge to a downwardly depending flange 54. Flange 54 is in the form of a tube which extends down interiorly of tube 14 and substantially seals thereagainst. It is in light press-fit engagement with interior tube 14, so that the water flow controller 50 is held in place and provides a substantial seal. Annular ring 56 extends outwardly at the juncture between cover 52 and flange 54. The annular ring preferably has a solid semi-circular cross section and extends sufficiently far out to locate itself on the interior surface of upper chamber 12, just above tube 14, as is shown in FIG. 2. Thus, ring 56 serves as a downward limit stop for the positioning of water flow controller 50. Handle 58 is secured to the water flow controller, in order to permit the flow controller to be inserted into and removed from the upper part of tube 14. Water flow control in the illustrated embodiment is accomplished by means of four slots through the upper part of flange 54 and undercutting through ring 56. Two of these slots are shown at 60 and 62 in FIG. 1, while the other two are evenly spaced around water flow controller 50.

The slots extend from below the mating point of the tube 14 and flange 54 upward to terminate at the top plane of cover 52. Thus, the top of slot 60 terminates at the juncture between the cover 52 and the flange 54. This slot construction provides the capability for upward flow of air, steam, and coffee gases and downward flow for the incoming hot water. The incoming water drenches the coffee grounds. The slow-forming water holds the coffee grounds in a pack, except for a small amount of surface grounds, which may be disturbed by the inflowing water. However, the majority of the grounds simply lie upon the filter, are drenched in that position and release coffee gases resulting from the interaction of the hot water with the coffee grounds. Brew usually begins dripping slowly in about 5 to 10 seconds and this delay is notable, because it provides an initial brew which has a significant amount of coffee extract therein. After the period of steam and gas venting, the venting is completed and the dripping speed increases noticeably.

It will be noted that, except for the micro-pore openings in filter 44 and the slotted openings like slot 60 in the controller 50, the brewing chamber 28 is completely sealed and unvented.

The slots in the water flow controller are located above the coffee grounds at a sufficient height where they are able to discharge the water onto the top of the coffee grounds and yet not so close as to cause entrapment of air, steam, and gases. It has been demonstrated in tests that, as the water flow controller is lowered closer to the coffee grounds, an equilibrium develops between the pressure of the rising gases which equals the downward pressure of the water. The result is that flow stops, and the coffee maker fails to complete its cycle. Optimum positioning of the flow controller provides sufficient space for an adequate volume of heated air, steam, and coffee gases. These gases bubble up through the slots to vent completely. Full water flow is then assured.

The principal criticality in the coffee maker 10 resides in the inlet openings, the outlet openings, and the positioning of the water flow controller 50 in the coffee-brewing chamber 28.

In the opinion of most coffee experts, the drip method produces the best coffee infusion. There are a number of variables involved in brewing drip coffee. First of all, proper brewing time has been indicated as being between 3 and 6 minutes using drip grind coffee, and between 1 and 3 minutes when using fine grind coffee. A shorter brewing time results in weak coffee, while longer brewing causes extraction of the harsher flavors from the ground coffee bean. Factors which cause variation in brewing time include water hardness, which reacts with coffee oil to produce filter-clogging products, and the amount of fines in the coffee grind.

While coffee standards specify the larger sizes in a grind, they do not specify the various degrees of fineness of the finer particles which pass through a 28-mesh screen used in the drip grind and fine grind standard tests. The two structural controls on brewing time are the size and number of water inlet slots 60 and the character of the filter 44. The filter 44 must be sufficiently fine to retain the coffee fines, but must be sufficiently coarse to permit coffee infusion to flow from the coffee-brewing chamber and to permit all of the water to pass through the chamber within the recommended maximum time limit. The preferred embodiment of filter 44 is a metal wire mesh having openings of 25 microns in size (absolute micron rating with a tolerance of ± 5 microns). The diameter of the filter mesh, interiorly of mounting means 46, is 1 ¼ inches which is suitable for use with drip grind coffee. A larger diameter filter is provided for use with fine grind coffee. Coupled with the considerations discussed above and below, this filter 44 provides for proper filtration and coffee brewing at the proper rate. When the filter is of less than 20 micron opening, the flow is too slow because the coffee fines plug it too readily. If the filter is larger than 30 microns, flow is too fast, the water is not retained in the brewing chamber for the optimum length of time, and sediment passes through the filter producing a murky, unclear brew. Perfect filtering and practical flow capability are only possible when using micromesh with the absolute micron rating of 25 ± 5 microns. Thus, it now will be appreciated that one of the critical aspects of this invention is the discovery that maximum utility resides in the use of a particular "micromesh" filter which, for the purposes of this invention, is defined as metal mesh filter cloth that will not pass particles larger than its absolute micron rating of 25 ± 5 microns; it further will be appreciated that such cloth normally is available and specified by a nominal micron rating which varies from an absolute rating so that, for example, nominally rated metal mesh filter cloth of 19 ± 5 microns usually will provide the desired absolute rating values.

Previous attempts at employment of metal micromesh in coffee makers have been unsuccessful. The size of the openings in the micromesh is critical, control of the speed of water flow is critical, and it is also critical that the water inlet to the dry coffee grounds be designed to prevent a suspension of the grounds in the water. Such action would permit the fines to settle out upon the mesh, before the more coarse ground coffee particles settle out from the suspension, thus to cause plugging of the mesh. In other words, in order to be successful, the micromesh filter must have a non-stratified deposit of wet coffee grounds thereon, in order to permit the correct rate of coffee infusion therethrough. Thus, the precise balance of all the factors described above were found to be critical while developing this invention because they must act together to cause the correct brewing time for an optimum coffee infusion.

The water must first slowly enter the coffee-brewing chamber for wetting the coffee. Floating of coffee is undesirable, because floatation permits the fines to settle out upon the micromesh filter. The coffee must lie upon the filter as it is wetted. Flow is minimized at the beginning by discharge of air and coffee gases from the brewing chamber upwardly through the slots. After these gases cease flowing, the incoming water can flow faster to steep with the grounds and filter down through the micromesh filter.

To describe the operation of illustrated drip coffee maker, filter holder 34 is screwed in place and a measure of drip grind coffee 64 is placed on the top of the filter 44. Water flow controller 50 is put in place, as is illustrated in FIG. 2, and the coffee maker 10 is placed on top of cup 26. It must be noticed that the dimensions and criticality discussed in the specification are related to the making of a single cup of coffee brew using drip rind coffee. The coffee maker 10 can be optionally designed for brewing a larger quantity of coffee, but the various dimensions must be suitably adjusted to do so. Thereupon, one cup of boiling water is poured into upper chamber 12. Brewing temperature is important and it should be in the range from 185° to 205°. During the brewing time involved in the present coffee maker, the pouring of one cup of boiling water into upper chamber 12 results in water having a maximum temperature of about 202° F. in the brewing chamber due to heat losses to the air and brewing chamber during pouring. Thus, optimum brewing temperature is accomplished.

Aside from the management of brewing time accomplished by the design of the coffee maker, brewing time variation is caused by water hardness and by a high percentage of fines in the coffee grind. With softer water, the brewing time is less, which indicates that the softer water does not react with coffee oil to produce filter clogging products as is the case with hard water. Furthermore, the more coarse the coffee grind, the faster the water is permitted to pass through the coffee-brewing chamber with minimized brewing time. Of course, the coarseness of the maximum-sized ground coffee particles is not directly related to the amount of fines in the coffee. However, the critical relationships of the water inlet and the coffee infusion outlet of the illustrated coffee maker of this invention minimize the quantity of fines that settle upon the micromesh filter, so that the amount of fines does not substantially affect the brewing time. The coffee maker 10 makes coffee brewed from soft water and coarse grind coffee, as well as from hard water and fine grind coffee, both of which are crystal clear, taste good, and are rich in flavor without being bitter.

It must be emphasized that water flow control is the most important mechanical feature of this invention. When operating a coffee maker of the previously described configuration without a flow control device, the performance is found to be completely unsatisfactory. When water is poured directly upon the ground coffee, the turbulent action of the water causes suspension of the coffee grounds in the water in the form of a well-mixed slurry. Water flows through the filter very quickly without being in brewing contact with the coffee grounds for a sufficient period of time to permit proper extraction. Fines then begin to settle in advance of the larger coffee particles, causing a dense, muddy deposit on the surface of the filter. The muddy deposit sharply reduces the flow of water through the filter for the remainder of the brewing cycle. The resultant infusion consists of approximately ninety percent insufficiently brewed coffee mixed with ten percent excessively strong coffee. Such an infusion is inferior in flavor, body, and aroma.

In order to prevent this from happening, slots 60 are of such size as to permit water to wet the grounds 64 without causing turbulence which would cause flotation of the grounds or the formation of a slurry. The grounds are wet, but with a minimum flow of water during the first stages. As the grounds are wet, gases are emitted therefrom and the original air in the coffee-brewing chamber expands from being heated. This causes an upward flow of gases through the slots to minimize downflow of hot water. However, during this time, the grounds are already wet to start the extraction of the coffee infusion. Thus, before dripping begins, a desired delay of several seconds is obtained during the early stages.

As steeping goes on, finally the gases are discharged sufficiently to permit the downflow of water from upper chamber 12 into brewing chamber 28 to a sufficient extent to pass therethrough at a proper rate. The rate is such that the now wet coffee grounds are not lifted and, thus, no stratification by settling takes place on the filter 44. Instead, the larger coffee grounds overlie the filter, as is shown in FIG. 5, to prevent plugging of the mesh. Flow continues so that the entire amount of brewing water (except for that wetting the grounds) passes through the brewing chamber within the maximum recommended time limit. Thus, the desired delay of flow at the beginning of the cycle coupled with a more rapid and uniform rate of flow during the remainder of the cycle result in an optimum brew.

The criticality of flow control is satisfied with the micromesh filter described above, and the design of the flow control device with the four slots. The illustrated four slots 60 are cut through ring 56. In the illustrated preferred embodiment, the ring 56 is one-fourth inch thick vertically so that each slot has a passageway of about one-fourth inch in height by about one-eighth inch in width, with a radial opening in the cover 52 of about one-sixteenth inch. As seen in FIG. 6, water flow is defined by the space between the top of the slot and the engagement of ring 56 onto the wall of upper chamber 12. For this type of construction, brew usually begins dripping in about 5 to 10 seconds and it is notable because it has a rich, brown look, signifying that it contains a substantial amount of coffee infusion. The result is a fine, satisfying cup of coffee possessing all the aroma, flavor and body available from the coffee bean without extracting harsh acids and bitter flavors, which would have been extracted by brewing for too long a time or at too high a temperature. Accordingly, the combination of criteria results in an optimum critical structure for the production of one cup of coffee by the drip method.

It should be understood that the foregoing description of the size and locations of the slots 60, while critical insofar as relative dimensions are concerned, are not intended to exclude usage of openings having other shapes and configurations within the operational parameters of the teachings of this application and, thus, the term "openings" is used herein to include slots, holes, and other shapes. Similarly, the water flow controller 50 need not have the ring 56 per se, since ring 56 functions primarily as a positioning element to determine the location of the "roof" or cover 52 above the coffee in the brewing chamber and also to determine the location of the "slot" opening. Instead, water flow controller 50 may be cylindrical and have radially outward protrusions or lugs from flange 54 to engage against the upper edge of tube 14 as a positioning limit stop, or may have other configurations which, in cooperation with a tube such as tube 14, attain the required positional limit relationship as described above.

Thus, while particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A drip coffee maker for the brewing of a coffee infusion from coffee ground to at least as fine as drip grind coffee standards comprising:
   a coffee-brewing chamber for the containment of coffee ground to at least as fine as drip grind coffee standards;
   an opening in the bottom of said coffee-brewing chamber, said opening being closed by a micropore outlet filter, said filter having outlet openings of about 25 microns so as to substantially prevent passage of visible coffee sediment from said brewing chamber but to permit the passage of water-extracted coffee infusion therethrough; and
   water inlet flow control means in the top of said chamber,
   said flow control means having a plurality of inlet openings of such size and quantity as both to direct and control the inflow of water into said brewing chamber so that the water flow to the grounds in said chamber is controlled to prevent turbulent lifting of all the grounds from said outlet filter, thus preventing fine sediment from settling on and plugging the micro-pore outlet openings as the coffee infusion passes through the filter so that the length of coffee-brewing time is consistent and uniform,
   said flow control means being so positioned relative to the grounds in said chamber, and said inlet openings being of said size and quantity, as also to control the upward venting outflow of gases therethrough in such a manner as to limit inflow of water until the coffee grounds are wetted and then to prevent entrapment of gases by freely venting such gases therethrough to ensure steady inflow of water into said brewing chamber with respect to the outflow of water-extracted coffee infusion through said micro-pore outlet filter during brewing.

2. The coffee maker of claim 1 wherein:
   said brewing chamber is a hollow chamber having its bottom defined by said outlet filter, said outlet filter being positioned in a filter holder, and said filter holder being screwed onto the body forming said coffee-brewing chamber.

3. The coffee maker of claim 2 wherein:
   said body forming said coffee-brewing chamber is a tubular body, said tubular body having a flexible seal flange at its lower end and having exterior threads thereon, said filter holder being threadedly engaged with said exterior threads on said tubular body and engaged with said seal flange so that said filter holder is sealed to said body and all downward-flowing aqueous coffee infusion is constrained to pass through said micropore filter.

4. A drip coffee maker for the brewing of a coffee infusion from coffee ground to at least as fine as drip grind coffee standards comprising:
   a coffee-brewing chamber for the containment of coffee ground to at least as fine as drip coffee-brewing standards, said coffee-brewing chamber being formed by a hollow tubular body, said tubular body having a flexible seal flange at its lower end and having exterior screw threads thereon, a micro-pore outlet filter positioned on the bottom of said body to define the hollow brewing chamber therein, a filter holder having screw threads thereon, said threads on said filter holder being threadedly engaged with said threads on said tubular body;
   one of said screw threads on said filter holder and on said coffee-brewing chamber being rectangular in cross section while the other is substantially semi-circular in cross section to minimize inter-thread engagement area, said filter holder being engaged with said seal flange so that said filter holder is sealed to said body and all downward-flowing aqueous coffee infusion is constrained to pass through said micro-pore filter.

5. The coffee maker of claim 1 wherein:
   an upper chamber is positioned above said water inlet flow control means, said upper chamber being of sufficient size to receive hot water for coffee brewing, said upper chamber being separated from said coffee-brewing chamber by said water inlet flow control means.

6. A drip coffee maker for the brewing of a coffee infusion from coffee ground to at least as fine as drip grind coffee standards comprising:
- a coffee brewing chamber for the containment of coffee ground to at least as fine as drip coffee-brewing standards;
- an upper chamber positioned above said coffee-brewing chamber, said upper chamber being of sufficient size to receive hot water for coffee brewing, said upper chamber being separated from said coffee-brewing chamber by water inlet flow control means;
- an opening in the bottom of said coffee-brewing chamber, said opening being closed by a micropore outlet filter, said filter being of such configuration as to substantially retain the ground coffee fines in said brewing chamber but to permit the passage of water-extracted coffee infusion therethrough; and
- said water inlet flow control means being positioned in the top of said coffee-brewing chamber for controlling the inflow of water into said brewing chamber from said upper chamber so that the water flow to the grounds in said brewing chamber is controlled and the length of coffee-brewing time is controlled;
- said water flow controller comprising a cover extending across the top of said coffee-brewing chamber to substantially close the top of said coffee-brewing chamber and a flange extending downwardly interiorly of said coffee-brewing chamber and substantially engaging the side walls of said coffee-brewing chamber, a plurality of openings being formed substantially at the junction between said flange and said cover of said water flow controller.

7. The coffee maker of claim 6 wherein:
said water flow controller has an exterior ring thereon of greater diameter than the interior of said coffee-brewing chamber to serve as a stop as said water flow controller is placed into the top of said coffee-brewing chamber, said openings extending through said flange and through said ring.

8. The coffee maker of claim 7 wherein:
said cover is imperforate and said openings comprise the only water flow passages from said upper chamber into said coffee-brewing chamber so that, upon initiation of water flow from said upper chamber through said openings into said coffee-brewing chamber, the upward flow of gas from said coffee-brewing chamber restricts downward water flow until after gas flow is substantially complete whereupon water flow continues at a maximum rate controlled by said openings.

9. The coffee maker of claim 8 wherein:
said brewing chamber is a hollow chamber having its bottom defined by said outlet filter, said outlet filter being positioned in a filter holder, and said filter holder being screwed onto the body forming said coffee-brewing chamber.

10. The coffee maker of claim 9 wherein:
said outlet filter is a micromesh metal filter having a plurality of openings in the range from 20 to 30 microns.

11. The coffee maker of claim 9 wherein:
said body forming said coffee-brewing chamber is a tubular body, said tubular body having a flexible seal flange at its lower end and having exterior screw threads thereon, said filter holder having screw threads threadedly engaged with said exterior threads on said tubular body and engaging with said seal flange so that said filter holder is sealed to said body and all downward-flowing aqueous coffee infusion is constrained to pass through said micromesh filter.

12. The coffee maker of claim 11 wherein:
one of said screw threads on said filter holder and on said coffee-brewing chamber is rectangular in cross section while the other is substantially semicircular in cross section to minimize interthread engagement areas.

13. The coffee maker of claim 11 wherein:
said outlet filter is a micromesh metal filter having a plurality of openings in the range from 20 to 30 microns.

14. The coffee maker of claim 1 wherein:
said water inlet flow control means comprises a cover extending across the top of said coffee-brewing chamber to substantially close the top of said coffee-brewing chamber and a flange substantially engaging the side walls of said coffee-brewing chamber, said inlet openings being formed substantially at the junction between said flange and said cover.

* * * * *